(12) United States Patent
Koga

(10) Patent No.: US 7,022,018 B2
(45) Date of Patent: Apr. 4, 2006

(54) DRIVE UNIT

(75) Inventor: Yoshitaka Koga, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/442,112

(22) Filed: May 21, 2003

(65) Prior Publication Data

US 2004/0009819 A1    Jan. 15, 2004

(30) Foreign Application Priority Data

May 21, 2002 (JP) ............................. 2002-146094
Mar. 19, 2003 (JP) ............................. 2003-075891

(51) Int. Cl.
*F16C 1/08* (2006.01)

(52) U.S. Cl. .................... 464/52; 403/347; 297/463.1; 74/502.6

(58) Field of Classification Search ................ 464/52, 464/53, 58, 60; 403/345, 347, 360; 74/502.6, 74/502.5; 297/463.1; 63/3.1; 29/525; 279/104, 279/906; 411/451.2, 451.1; 24/618, 697.1, 24/629, 711.4, 697, 711
See application file for complete search history.

(56) References Cited

U.S. PATENT DOCUMENTS

| | | | | |
|---|---|---|---|---|
| 1,871,528 A | * | 8/1932 | Joline | 464/53 |
| 2,917,909 A | * | 12/1959 | Josutis | 464/58 |
| 4,340,331 A | * | 7/1982 | Savino | 411/451.2 X |
| 4,827,941 A | * | 5/1989 | Taylor et al. | 29/525 X |
| 4,961,433 A | * | 10/1990 | Christian | |
| 5,558,578 A | * | 9/1996 | Uryu et al. | 464/52 |
| 5,643,520 A | * | 7/1997 | Carmien | 29/525 X |
| 6,167,725 B1 | * | 1/2001 | Siekierski | 24/618 X |

FOREIGN PATENT DOCUMENTS

| | | | |
|---|---|---|---|
| DE | 197 17 502 C1 | * | 10/1998 |
| JP | 9-86236 A | | 3/1997 |
| JP | 2004-84922 | * | 3/2004 |

* cited by examiner

*Primary Examiner*—Greg Binda
(74) *Attorney, Agent, or Firm*—Buchanan Ingersoll PC

(57) ABSTRACT

A drive unit includes a cable possessing connecting portions at both ends, one of the connecting portions inserted into a groove of an output shaft at one side, and the other one of the connecting portions inserted into a groove of an input shaft at the other side, wherein rotational torque from the output shaft is transmitted to the input shaft, and at least two projected portions provided on the respective connecting portions and arranged with a predetermined distance therebetween in a longitudinal direction of the cable, wherein the respective connecting portions possess bent-shaped structures and the two projected portions of the respective connecting portions become in contact with opposed surfaces of the respective grooves.

19 Claims, 4 Drawing Sheets

DRIVE UNIT

CROSS REFERENCE TO RELATED APPLICATIONS

This application is based on and claims priority under 35 U.S.C. §119 with respect to a Japanese Patent Application 2002-146094, filed on May 21, 2002, and 2003-075891, filed on Mar. 19, 2003, the entire content of which is incorporated herein by reference.

FIELD OF THE INVENTION

This invention generally relates to a drive unit provided with a flexible cable for transmitting rotational torque from an output shaft of a driving source to an input shaft of a driven apparatus.

BACKGROUND OF THE INVENTION

There is a conventional drive apparatus disclosed in a Japanese Patent Laid-Open Publication No. 9-86236. This disclosed drive apparatus is provided with a flexible cable for transmitting rotational torque from an output shaft of a motor to an input shaft of a speed reduction gear. More particularly, there are resilient members disposed in clearances defined between both ends of the flexible cable engagably inserted into respective grooves of the output and input shafts and the grooves, respectively, thereby capable of preventing abnormal noises from occurring at the engaged portions of the flexible cable with the grooves upon transmitting the rotational torque.

However, the drive apparatus provided with the resilient members may cost much and assembling of components for the drive apparatus may become complex.

The present invention therefore seeks to provide an improved drive unit capable of inhibiting abnormal noises from occurring without requiring other members.

SUMMARY OF THE INVENTION

According to an aspect of the present invention, a drive unit includes a cable possessing connecting portions at both ends. One of the connecting portions is inserted into a groove of an output shaft at one side, and the other one of the connecting portions is inserted into a groove of an input shaft at the other side, wherein rotational torque from the output shaft is transmitted to the input shaft. The drive unit further includes at least two projected portions are provided on the respective connecting portions and are arranged with a predetermined distance therebetween in a longitudinal direction of the cable, wherein the respective connecting portions possess bent-shaped structures and the two projected portions of the respective connecting portions become in contact with opposed surfaces of the respective grooves.

According to another aspect of the present invention, the respective grooves possess approximately polygonal-shaped structures, and the respective projected portions of the respective connecting portions are formed to become in contact with two adjacent inner surfaces of the respective grooves.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Preferred embodiments of the present invention will be described hereinbelow in detail with reference to the accompanying drawings. Here will be described one example of a drive unit of the present invention applied for a vehicle seat apparatus.

Figure 1:
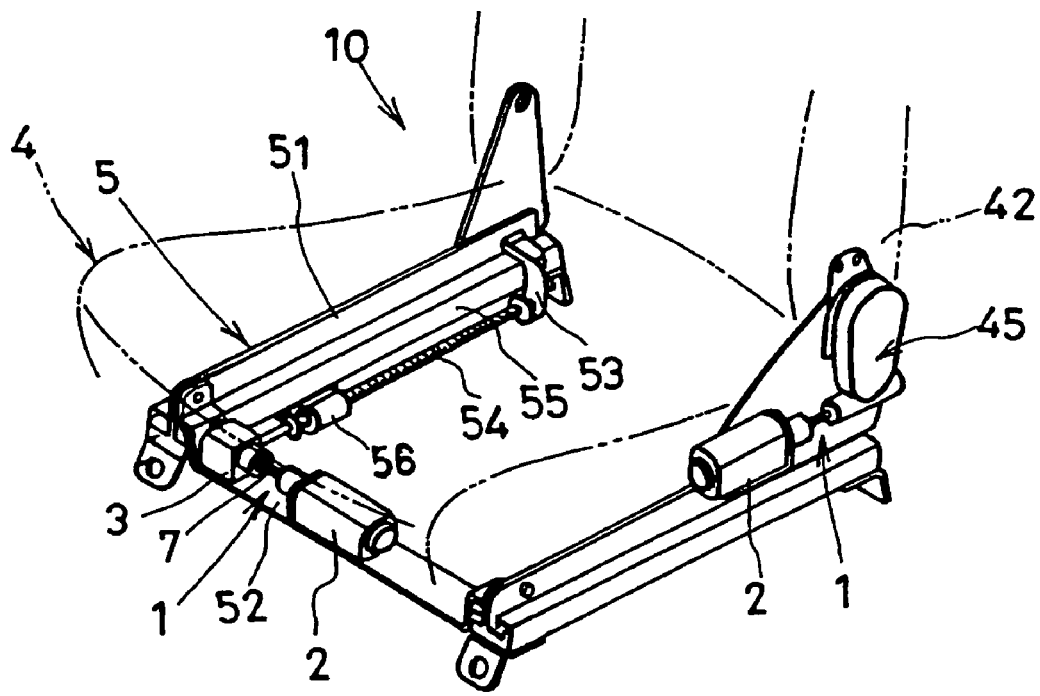
FIG. 1 is a perspective view illustrating a seat apparatus provided with a drive unit according to embodiments of the present invention.
Figure 2:
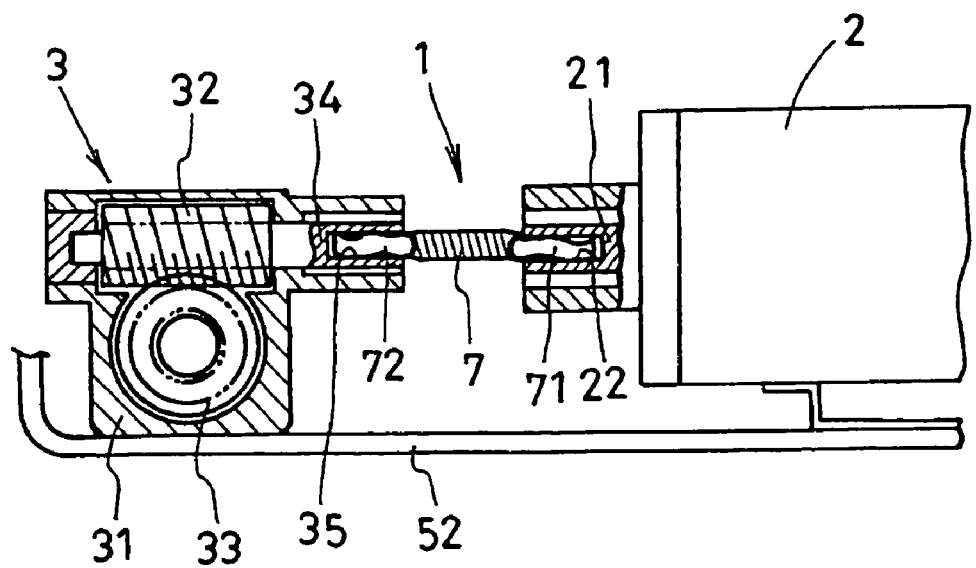
FIG. 2 is a side view in section illustrating the drive unit according to the first embodiment of the present invention.

As illustrated in FIGS. 1 and 2, a seat apparatus 10 possessing a drive unit 1 of the present invention is provided with a seat sliding mechanism 5 capable of adjusting a vehicle longitudinal position of the seat apparatus 10. The seat sliding mechanism 5 includes a pair of upper rails 51 fixed to a bottom surface of a seat cushion 4 and a pair of lower rails 55 secured to a vehicle floor (not shown) and slidably engaged to the respective upper rails 51.

The drive unit 1 for driving the seat sliding mechanism 5 is provided with a motor 2 as a driving source and a speed reduction gear 3. The motor 2 having an output shaft 21 (illustrated in FIG. 2) is fixedly mounted on a bracket 52 which bridges the pair of upper rails 51. A housing 31 of the speed reduction gear 3 is also fixedly mounted on the bracket 52 and houses a worm gear 32 and a worm wheel gear 33 meshed with the worm gear 32. The worm gear 32 of the speed reduction gear 3 possesses an input shaft 34 rotatably supported by the housing 31. A screw shaft 54 extends parallel with the upper rail 51 and is rotatably supported by a bracket 53 fixed to the upper rail 51. The worm wheel gear 33 is connected with the screw shaft 54 and is integrally rotated therewith so as to transmit rotational torque from the motor 2 to the screw shaft 54. A nut member 56 is secured to the lower rail 55 and is engaged with the screw shaft 54. Therefore, when the rotational torque from the motor 2 is transmitted to the screw shaft 54, the screw shaft 54 can be rotated, thereby capable of slidably moving the upper rails 51 in the longitudinal direction relative to the lower rails 55.

Figure 3:
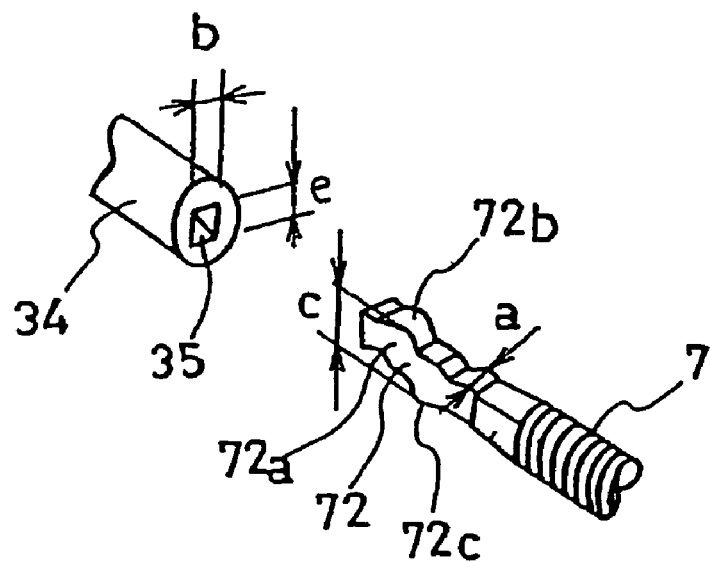
FIG. 3 is a perspective view illustrating a structure of a connecting portion of a cable according to the first embodiment of the present invention.
Figure 4:
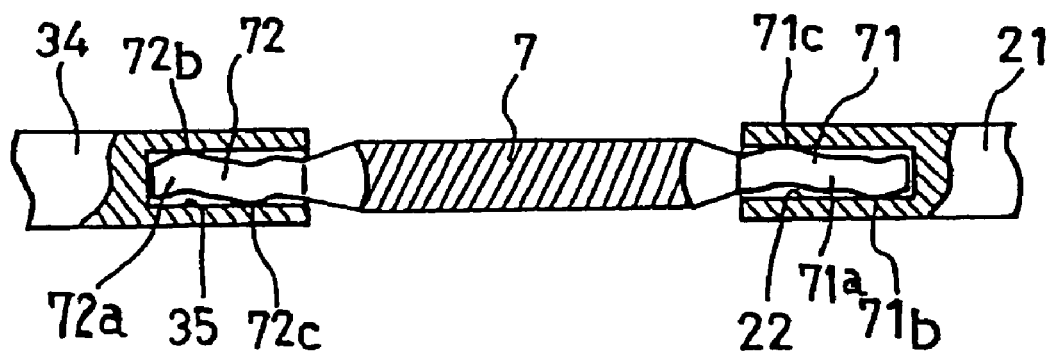
FIG. 4 is a side view in section illustrating the structure of the connecting portion of the cable according to the first embodiment of the present invention.

As illustrated in FIGS. 2, 3, and 4, the output shaft 21 of the motor 2 is connected to the input shaft 34 of the speed reduction gear 3 via a cable 7. The cable 7 is manufactured by twisting a conducting wire and possesses resilience and flexibility. End portions of the cable 7 are applied with a press-process so as to mold connecting portions 71 and 72. The output shaft 21 of the motor 2 is provided with an approximately square-shaped groove 22 about a central axis of an end portion of the output shaft 21. The input shaft 34 of the speed reduction gear 3 is provided with an approximately square-shaped groove 35 about a central axis of an end portion of the input shaft 34. The connecting portions 71 and 72 are inserted into the grooves 22 and 35 respectively so as to connect the output shaft 21 of the motor 2 and the input shaft 34 of speed reduction gear 3, i.e. so as to transmit the rotational torque from the output shaft 21 of the motor 2 to the input shaft 34 of the speed reduction gear 3. Further, according to the drive unit 1 with the above-described structure, any misalignment of the output shaft 21 and the input shaft 34 can be effectively absorbed owning to flexibility of the cable 7, thereby capable performing preferable rotational torque transmission.

As illustrated in FIGS. 3 and 4, the connecting portions 71 and 72 are provided with a pair of side surface portions 71a and a pair of side surface portions 72a, respectively. Each pair of side surface portions 71a and 72a extends in a longitudinal direction of the cable 7 with a constant width a (as seen in FIG. 3) therebetween. Each connecting portion 71 and 72 possesses an approximately square-shaped cross section, which is usually formed by a press-forming method. The width a of each connecting portion 71 and 72 is preset slightly less than the lateral width dimension b of each groove 22 and 35 into which each connecting portion 71 and 72 is inserted. The pair of side surface portions 71a is provided with a pair of projections (i.e. projected portions) 71b and 71c at upper and down end portions thereof. The pair of side surface portions 72a is also provided with a pair of projections (i.e. projected portions) 72b and 72c at upper and down end portions thereof. An opposite end surface of each projection 71b, 71c, 72b, and 72c is of an approximately recessed-shaped structure. Therefore, each connecting portion 71 and 72 is bent with an approximately constant width and extends in the longitudinal direction of the cable 7. The projections 71b and 71c are formed on the connecting portion 71 with a predetermined distance therebetween in the longitudinal direction of the cable 7. The projections 72b and 72c are also formed on the connecting portion 72 with a predetermined distance therebetween in the longitudinal direction.

A distance c in a vertical direction between peak points of the projections 71b and 71c and between peak points of the projections 72b and 72c is preset slightly greater than the vertical width dimension e of the grooves 22 and 35. As illustrated in FIG. 4, the projections 71b and 71c are arranged symmetrical about a central point in the longitudinal direction of the cable 7 with the projections 72b and 72c, respectively. Further, the projection 71b is arranged opposite to the projection 72b in the vertical direction. The projection 71c is also arranged opposite to the projection 72c in the vertical direction. Therefore, when the connecting portions 71 and 72 are inserted into the grooves 22 and 35 respectively, each projection 71b, 71c, 72b, and 72c becomes in contact with an inner surface of each groove 22 and 35, wherein each connecting portion 71 and 72 can be supported in each groove 22 and 35 with load therebetween.

Next, the following description will be given for explaining assembly of the drive unit 1 with the above described structure and operation thereof.

The connecting portions 71 and 72 of the cable 7 are inserted into the grooves 22 and 35, respectively. In this case, the bent connecting portions 71 and 72 are slightly deformed, thereby capable of generating a predetermined load to be applied to the grooves 22 and 35. The load can be maintained by inserting the connecting portions 71 and 72 into the grooves 22 and 35. Accordingly, even when the rotational torque from the motor 2 is transmitted, the engagements between the projections and the inner surface of each groove is maintained so as to inhibit abnormal noises such as chattering due to play between the connecting portions 71, 72 and the grooves 22, 35.

According to the above-described first embodiment of the present invention, the two projections are provided on each connecting portion of the cable 7. However, especially when the cable 7 is long, it is preferable that the greater number of projections can be provided on each connecting portion of the cable 7 so as to maintain the load between the connecting portions and the grooves in relation to stiffness of the cable 7.

According to the above-described first embodiment of the present invention, each projection is arranged symmetrical thereto about the central point in the longitudinal direction of the cable 7. However, the arranged position of each projection can be determined in light of the amount of torque to be transmitted. Therefore, the arrangement of each projection is not only limited to the first embodiment of the present invention as far as a requisite contact load can be assured.

Next, the following description will be given for explaining the drive unit 1 according to a second embodiment of the present invention with reference to FIGS. 5, 6 and 7.

Figure 5:
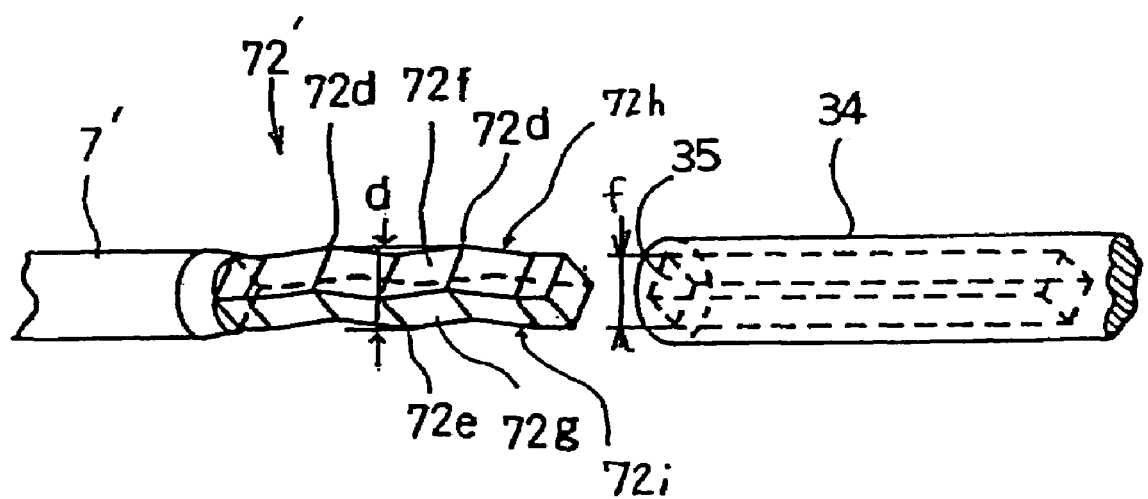
FIG. 5 is a perspective view illustrating a structure of a connecting portion of a cable according to the second embodiment of the present invention.
Figure 6:
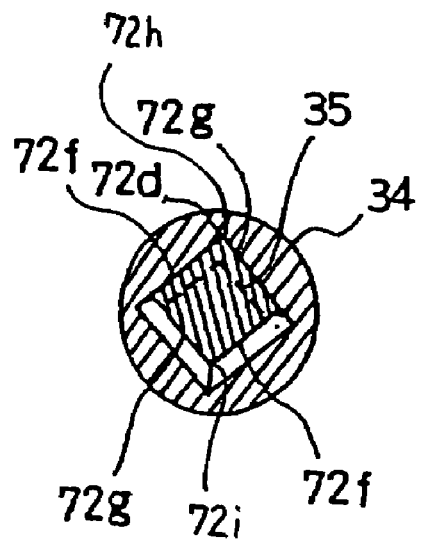
FIG. 6 is a cross sectional view taken along the section line VI—VI in FIG. 7 illustrating the connecting portion inserted into a groove of an output shaft according to the second embodiment of the present invention.
Figure 7:
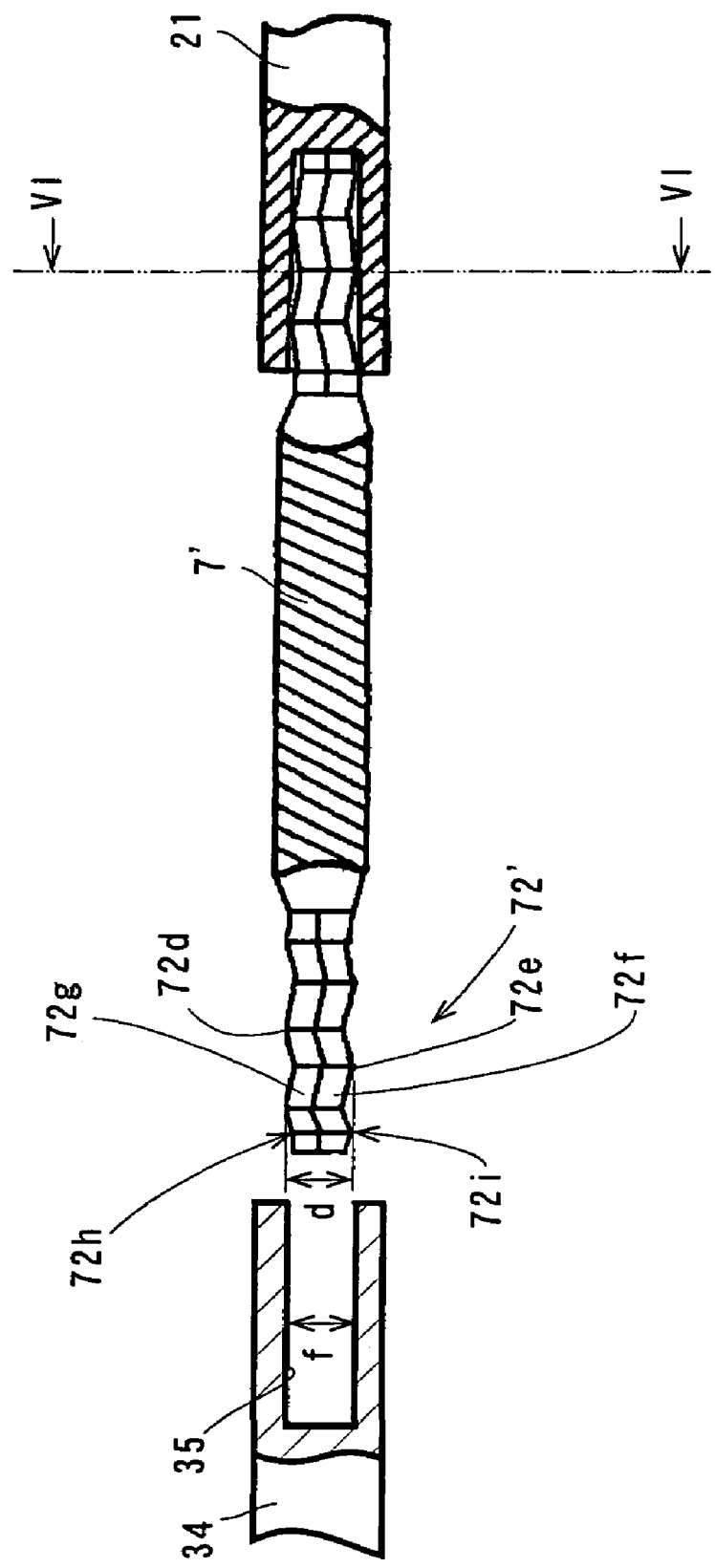
FIG. 7 is a side view in section illustrating the structure of the connecting portion of the cable according to the second embodiment of the present invention

FIG. 5 illustrates only one end of the cable 7', and yet the other end thereof possesses the same structure as the one end thereof as shown in FIG. 7. A connecting portion 72' of the cable 7' possessing an approximately square-shaped cross section is integrally provided with two projections (i.e. projected portions) 72d with a predetermined distance therebetween on one of ridgelines 72h thereof. The connecting portion 72' of the cable 7' is also integrally provided with a projection (i.e. a projected portion) 72e on a ridgeline 72i opposite to the ridgeline provided with the two projections 72d. When the ridgeline provided with the two projections 72d is arranged at an upper side as illustrated in FIG. 5, the connecting portion 72' undulates in a vertical direction thereof and extends in the longitudinal direction of the cable 7'. A distance d between a peak point of the projection 72d and a peak point of the projection 72e is preset slightly greater than the diagonal dimension f of the groove 35 which is the distance between diagonally opposite corners as shown in FIG. 5. As also shown in FIGS. 5 and 6, the connecting portion 72 possesses two oppositely located first surfaces 72f, 72f and two other oppositely located second surfaces 72g, 72g. One of the first surfaces 72f and the adjacent second surface 72g meet at one of the ridgelines 72h, while the other first surface 72f and the other second surface 72g adjacent thereto meet at the other ridgeline 72i. FIG. 7 illustrates the connecting portion at one end of the cable inserted into the groove of the output shaft 21 and illustrates the connecting portion at the other end of the cable prior to insertion in the groove of the input shaft 34.

As illustrated in FIG. 6, when the connecting portion 72' is inserted into the groove 35 of the output shaft 34, the adjacent first and second surfaces 72f and 72g which meet at the ridgeline 72h along which the projections 72d are provided come in contact with two adjacent surfaces of the groove 35 at each projection 72d. In the meantime, the other adjacent first and second surfaces 72f and 72g which meet at the ridgeline 72i along which the projection 72e is provided also come in contact with the other two adjacent surfaces of the groove 35 at the projection 72e.

As described above, according to the driving unit 1 with the above-described structure, the connecting portion 72, 72' can be inserted into the groove 35 with a predetermined load in the same manner as the first embodiment, thereby capable of achieving a preferable rotational torque transmission between the motor 2 and the speed reduction gear 3 via the cable 7, 7' without any occurrence of abnormal noises.

According to the above-describe embodiments of the present invention, the configurations of the grooves 22, 35 and the connecting portions 71, 72, 72' are of the approximately square-shaped structure. However, the configurations are not only limited to the described one and can be of polygonal-shaped structure such as rectangular, triangular or pentagonal shape.

As described above, each projection formed on each connecting portion of the cables 7, 7' becomes in contact with the inner surface of each groove. Therefore, the contact load can be generated corresponding to the flexibility of the connecting portion, thereby capable of inhibiting abnormal noises from occurring at the connecting portion. Further, the drive unit according to the embodiments of the present invention is not required to possess an interposing member and can be manufactured at a lower cost. Further, an assembling performance can be improved.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

I claim:

1. A drive unit comprising:
a cable possessing connecting portions at both ends,
one of the connecting portions inserted into a groove of an output shaft, and
another one of the connecting portions inserted into a groove of an input shaft, wherein rotational torque from the output shaft is transmitted to the input shaft; and
each of the connecting portions possessing an undulating shape with respect to a longitudinal direction of the cable so that each connecting portion comprises at least two projected portions arranged with a predetermined distance therebetween in the longitudinal direction of the cable, wherein two projected portions of the respective connecting portions engage opposed surfaces of the respective grooves to transmit rotation from the output shaft to the input shaft by way of the cable.

2. A drive unit according to claim 1, wherein the respective grooves possess approximately polygonal-shaped structures, and the respective projected portions of the respective connecting portions are formed to become in contact with two adjacent inner surfaces of the respective grooves.

3. A drive unit according to claim 2, wherein the projected portions are press-formed on the respective connecting portions.

4. A drive unit according to claim 2, wherein the respective grooves possess approximately square-shaped structures.

5. A drive unit according to claim 4, wherein the respective connecting portions possess approximately square-shaped structures.

6. A drive unit according to claim 2, wherein the respective connecting portions possess approximately polygonal-shaped structures.

7. A drive unit according to claim 2, wherein a distance from a peak point of one of the projected portions of the respective connecting portions to a peak point of the other one of the projected portions is greater than a dimension between the opposed surfaces of the respective grooves that are engaged by the respective projected portions, wherein the respective connecting portions are supported with a load relative to the inner surfaces of the respective grooves.

8. A drive unit according to claim 2, wherein a distance from a peak point of one of the projected portions of the respective connecting portions to a peak point of the other one of the projected portions is greater than a diagonal dimension of the respective groove, wherein the respective connecting portions are supported with a load relative to the inner surfaces of the respective grooves.

9. A drive unit according to claim 1, wherein the projected portions are press-formed on the respective connecting portions.

10. A drive unit according to claim 1, wherein the two projected portions on one of the connecting portions are arranged substantially symmetrical to the two projected portions on the other one of the connecting portions about a central point in a longitudinal direction of the cable.

11. A drive unit according to claim 1, wherein a distance from a peak point of one of the projected portions of the respective connecting portions to a peak point of the other one of the projected portions is greater than a dimension between the opposed surfaces of the respective grooves that are engaged by the respective projected portions, wherein the respective connecting portions are supported with a load relative to the inner surfaces of the respective grooves.

12. A drive unit according to claim 1, wherein a distance from a peak point of one of the projected portions of the respective connecting portions to a peak point of the other one of the projected portions is greater than a diagonal dimension of the respective groove, wherein the respective connecting portions are supported with a load relative to the inner surfaces of the respective grooves.

13. A seat sliding apparatus comprising:
a pair of lower rails adapted to be secured to a vehicle floor;
a pair of upper rails adapted to be fixed to a cushion, each upper rail slidably engaging one of the lower rails;
a motor comprising an output shaft provided with a groove;
a speed reduction gear comprising an input shaft provided with a groove;
a cable comprising opposite end portions each provided with a connecting portion,
one of the connecting portions inserted into the groove of the output shaft;
another one of the connecting portions inserted into the groove of the input shaft;
each of the connecting portions possessing an undulating shape with respect to a longitudinal direction of the cable so that each connecting portion comprises at least two projected portions arranged with a predetermined distance therebetween in the longitudinal direction of the cable, the two projected portions of the respective connecting portions engaging surfaces of the respective grooves sufficient to transmit rotational torque from the output shaft of the motor to the input shaft of the speed reduction gear by way of the cable; and a screw shaft operatively connected to the speed reduction gear to and one of the upper rails.

14. A seat sliding apparatus according to claim 13, wherein each groove possesses an approximately polygonal shape, and the respective projected portions of the respective connecting portions contact adjacent inner surfaces of the respective grooves.

15. A seat sliding apparatus according to claim 13, wherein the projected portions are press-formed on the respective connecting portions.

16. A seat sliding apparatus according to claim 13, wherein each groove possesses an approximately square shape.

17. A seat sliding apparatus according to claim 13, wherein a distance from a peak point of one of the projected portions of the respective connecting portions to a peak point of the other one of the projected portions is greater than a dimension between the opposed surfaces of the respective grooves that are engaged by the respective projected portions, wherein the respective connecting portions are supported with a load relative to the inner surfaces of the respective grooves.

18. A seat sliding apparatus according to claim 13, wherein a distance from a peak point of one of the projected portions of the respective connecting portions to a peak point of the other one of the projected portions is greater than a diagonal dimension of the respective groove, wherein the respective connecting portions are supported with a load relative to the inner surfaces of the respective grooves.

19. A seat sliding apparatus according to claim 13, wherein the two projected portions on one of the connecting portions are arranged substantially symmetrical to the two projected portions on the other one of the connecting portions about a central point in a longitudinal direction of the cable.

* * * * *